(12) United States Patent
Takahashi et al.

(10) Patent No.: US 9,388,062 B2
(45) Date of Patent: Jul. 12, 2016

(54) OZONE LIQUID GENERATOR AND METHOD OF GENERATING OZONE LIQUID

(75) Inventors: Osamu Takahashi, Osaka (JP); Keiichiroh Watanabe, Osaka (JP); Akira Yoshida, Osaka (JP); Masaaki Ozaki, Osaka (JP); Hirotsugu Matoba, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 423 days.

(21) Appl. No.: 14/004,727

(22) PCT Filed: Feb. 9, 2012

(86) PCT No.: PCT/JP2012/052997
§ 371 (c)(1),
(2), (4) Date: Sep. 12, 2013

(87) PCT Pub. No.: WO2012/127921
PCT Pub. Date: Sep. 27, 2012

(65) Prior Publication Data
US 2013/0341288 A1    Dec. 26, 2013

(30) Foreign Application Priority Data

Mar. 18, 2011    (JP) .................................. 2011-060510

(51) Int. Cl.
| | | |
|---|---|---|
| *C02F 1/78* | (2006.01) | |
| *B01F 3/04* | (2006.01) | |
| *B01F 5/04* | (2006.01) | |
| *C01B 13/10* | (2006.01) | |

(52) U.S. Cl.
CPC ............... *C02F 1/78* (2013.01); *B01F 3/04503* (2013.01); *B01F 5/0428* (2013.01); *C01B 13/10* (2013.01); *B01F 2003/04886* (2013.01)

(58) Field of Classification Search
CPC ............... B01F 3/04503; B01F 5/0428; B01F 2003/04886; C01B 13/10; C02F 1/78
See application file for complete search history.

(56) References Cited

FOREIGN PATENT DOCUMENTS

| | | |
|---|---|---|
| JP | 02-207892 | 8/1990 |
| JP | 05-161895 | 6/1993 |
| JP | 2001-259390 | 9/2001 |
| JP | 2001-314738 | 11/2001 |
| JP | 2004-188246 | 7/2004 |

OTHER PUBLICATIONS

Translation JP 2001-314738 Device for Controlling Flow Rate of Ozone Water for Ozone Water Generator: (Published Nov. 13, 2001).*

(Continued)

*Primary Examiner* — Walter D Griffin
*Assistant Examiner* — Cameron J Allen
(74) *Attorney, Agent, or Firm* — Keating & Bennett, LLP

(57) ABSTRACT

An ozone generator generates ozone gas; a gas-liquid mixer mixes the ozone gas and a liquid; a liquid storage tank separates an introduced gas-liquid mixture into gas and a liquid; a circulation path circulates gas among the ozone generator, the gas-liquid mixer and the liquid storage tank; and an opening and closing control means controls a flow of gas flowing out through a gas outlet port of the liquid storage tank in accordance with a stored liquid amount in the liquid storage tank. As a result, the stored liquid amount of the liquid stored in the liquid storage tank can be adjusted.

6 Claims, 13 Drawing Sheets

(56) References Cited

OTHER PUBLICATIONS

Translation JP 2004/188246 System for Manufacturing Ozonized Water Inoue Yoji (Inventor). Toshiba Plant Sys & Services (Assignee). JP 2004188246 A. (Published Jul. 8, 2004).*
Translation JP 5161895 A. Apparatus for Purification of Hot Water in Bath Kondo Norimasa (Inventor). Janome Sewing Mach Co Ltd (Assignee). JP 5161895 A. (Published Jun. 29, 1993).*
Translation JP 2001259390 A. Ozone Water Making System (Inventors). JP 2001259390 A. (Published Sep. 25, 2001).*
International Search Report for International Application PCT/JP2012/052997 (Apr. 3, 2012).

* cited by examiner (a)

(b)

OZONE LIQUID GENERATOR AND METHOD OF GENERATING OZONE LIQUID

CROSS-REFERENCE TO RELATED APPLICATIONS

This application is a National Phase application filed under 35 USC 371 of PCT International Application No. PCT/JP2012/052997 with an International Filing Date of Feb. 9, 2012, which claims under 35 U.S.C. §119(a) the benefit of Japanese Application No. 2011-060510, filed Mar. 18, 2011, the entire contents of which are incorporated herein by reference.

TECHNICAL FIELD

The present invention relates to an ozone liquid generator and a method of generating an ozone liquid.

BACKGROUND ART

An ozone water generator conventionally includes an ozone generator and a gas-liquid mixer, and is operated to mix ozone gas generated in the ozone generator with a liquid such as water to generate ozone water. However, since ozone gas has low solubility to water, most of ozone gas generated in the ozone generator cannot be completely dissolved in water and discharged.

Thus, in order to increase the use efficiency of ozone gas, an ozone water generation apparatus collecting and recycling the undissolved and discharged ozone gas is disclosed. For example, Japanese Patent Laying-Open No. 02-207892 (PTD 1) discloses the invention including an ozone generator; a gas-liquid mixer; a hermetically-sealed tank having a function of separating a gas-liquid mixture into gas and a liquid; and a gas return path connecting the hermetically-sealed tank and the ozone generator. Ozone gas separated by the hermetically-sealed tank is supplied to the ozone generator through the gas return path. Thus, it becomes possible to recycle undissolved ozone gas contained in exhaust gas.

Furthermore, in the above-described configuration, when generation of ozone water is continued for a certain period of time, gas dissolves in water, which is then caused to flow to the outside of the ozone water generation apparatus. Consequently, the volume of the gas within the hermetically-sealed tank decreases. Thus, there are provided with a level switch capable of detecting the decreased amount of gas within the hermetically-sealed tank and a control circuit controlling supply of oxygen from an oxygen cylinder to the ozone generator, thereby allowing replenishment of oxygen, so that ozone water can be continuously generated with stability.

CITATION LIST

Patent Document

PTD 1: Japanese Patent Laying-Open No. 02-207892

SUMMARY OF INVENTION

Technical Problem

However, in the ozone water generation apparatus in PTD 1, an opening and closing valve or the like that opens and closes in accordance with the stored liquid amount is not provided in a gas outlet port provided in the hermetically-sealed tank. Accordingly, when the water level in the hermetically-sealed tank suddenly rises, entry of a liquid into the gas return path cannot be forcibly interrupted. Consequently, the liquid overflows through the gas outlet port, and the gas return path, the ozone generator and the like are immersed in the liquid.

In an ordinary ozone generator, an alternating-current (AC) voltage is applied between electrodes having an insulator interposed therebetween, to produce silent discharge and cause gas such as air or oxygen having pressure equal to or greater than atmospheric pressure to flow between the electrodes, thereby generating ozone gas. There are various types of electrode shapes, including a type having two flat plates of metal arranged in parallel for discharge; a type having a cylindrical-shaped metal and a columnar-shaped metal disposed at the center of the cylindrically-shaped metal, between which discharge occurs; and the like. It is known that, since this ozone generator causes silent discharge between electrodes, ozone gas generated based on humid oxygen and air containing a large amount of moisture leads to production of a large amount of nitrogen oxides, thereby lowering the generation efficiency of the ozone generator. Accordingly, the ozone water generation apparatus in PTD 1 causes a problem that liquid overflows the hermetically-sealed tank during a sudden rise of the water level in the hermetically-sealed tank, thereby lowering the ozone water concentration of the ozone water to be generated.

Furthermore, since the opening and closing valve and the like cannot completely interrupt the flow of the gas between the hermetically-sealed tank and the gas return path, the gas return path connected to the hermetically-sealed tank in the positive pressure state is always in such a state where gas flows from inside the hermetically-sealed tank toward the gas return path.

Accordingly, when oxygen is supplied from the oxygen cylinder to the ozone generator, oxygen should be pumped with pressure higher than internal pressure of the gas return path in communication with the hermetically-sealed tank in the positive pressure state. Otherwise, oxygen cannot be introduced into the ozone water generation apparatus. As a result, only by using the suction force obtained by self-suctioning of the gas-liquid mixer, gas within the hermetically-sealed tank is cause to flow out toward the oxygen cylinder. Thus, it is difficult to suction the gas from outside of the ozone water generation apparatus under low pressure such as atmospheric air.

The present invention has been made in light of the above-described problems, and an object of the present invention is to provide an ozone liquid generator implementing adjustment of the stored liquid amount by liquid storing means having a control valve for controlling flowing out of the gas.

Solution to Problem

An ozone liquid generator according to the present invention includes an ozone generator generating ozone gas; a gas-liquid mixer mixing the ozone gas and a liquid; a liquid storage tank separating an introduced gas-liquid mixture into gas and a liquid; a circulation path through which gas circulates among the ozone generator, the gas-liquid mixer and the liquid storage tank; and opening and closing control means for controlling a flow of gas flowing out through a gas outlet port of the liquid storage tank in accordance with a stored liquid amount in the liquid storage tank.

It is preferable that the circulation path of the ozone liquid generator according to the present invention further includes gas introducing means for introducing gas from outside.

A method of generating an ozone liquid according to the present invention is a method of generating an ozone liquid by separating an ozone liquid generated from ozone gas and a liquid into gas and a liquid by a liquid storage tank, and circulating the separated gas. The method includes the steps of: when a stored liquid amount of the liquid in the liquid storage tank is less than a specific amount, causing gas to flow out from the liquid storage tank and circulating the gas; and when the stored liquid amount of the liquid in the liquid storage tank is equal to or greater than the specific amount, stopping a flow of the gas flowing out from the liquid storage tank and introducing gas from outside of the ozone liquid generator.

Advantageous Effects of Invention

According to the present invention, an ozone liquid generator efficiently implementing adjustment of the stored liquid amount in the liquid storage tank is provided.

DESCRIPTION OF EMBODIMENTS

[First Embodiment]

Figure 1:
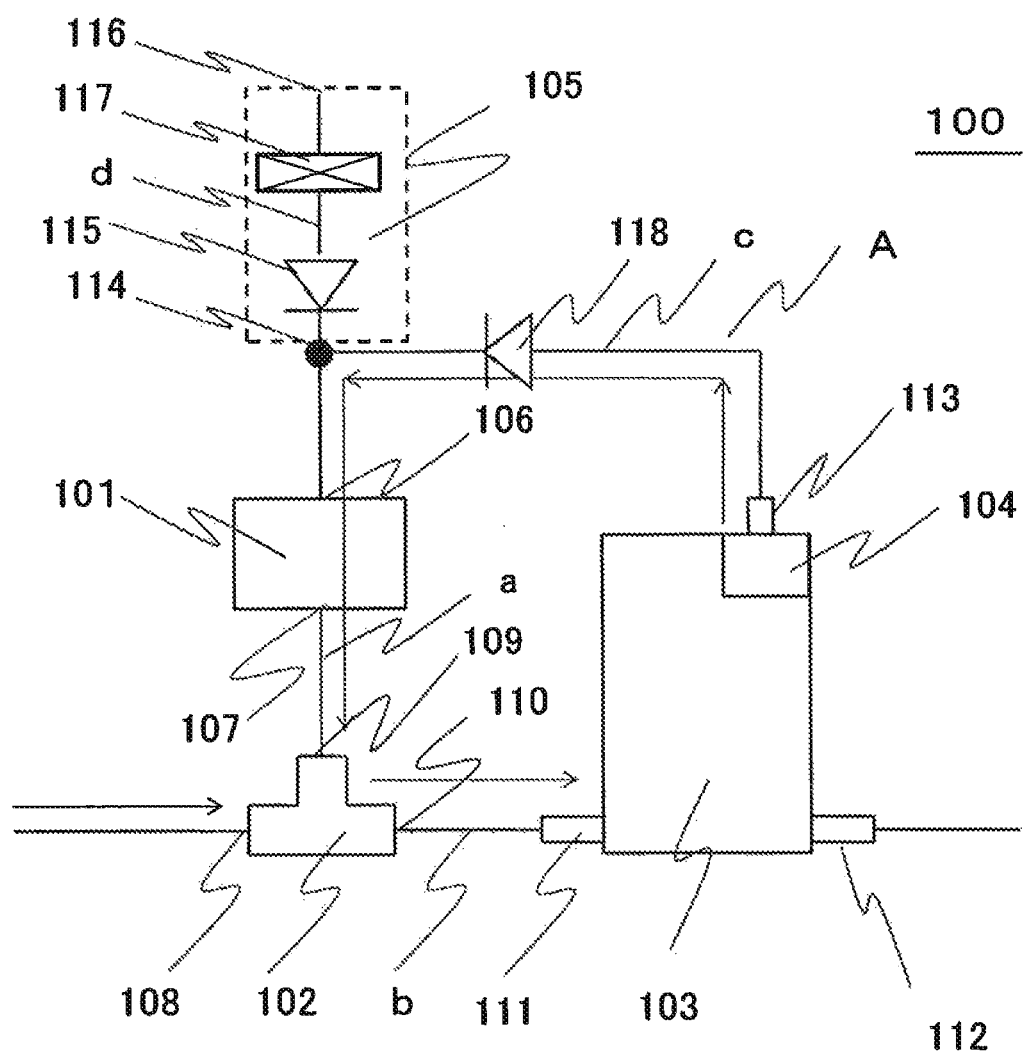
FIG. 1 is a schematic diagram of an ozone liquid generator according to one embodiment of the present invention.

One embodiment of the present invention will be hereinafter described with reference to FIG. 1. FIG. 1 is a schematic diagram of an ozone liquid generator according to one embodiment of the present invention. An ozone liquid generator 100 in FIG. 1 has a circulation path A through which gas or a liquid circulates. This circulation path A is provided with an ozone generator 101 generating ozone gas; a gas-liquid mixing portion 102 mixing the liquid and ozone gas; opening and closing control means 104 for controlling a flow of gas flowing out through a gas outlet port 113 of a liquid storage tank 103; liquid storage tank 103 storing a liquid; and gas introducing means 105 for introducing gas from outside of the ozone liquid generator.

Ozone generator 101 includes an inlet port 106 connected to a pipe line c and through which gas such as air or oxygen is introduced; an ozone gas generation element formed of an electrode made of metal or the like and generating ozone gas using the introduced air or oxygen as a material; and an outlet port 107 through which ozone gas flows out. Ozone gas is generated from oxygen introduced through inlet port 106, a part of oxygen contained in air and the like, and caused to flow out through outlet port 107. Ozone generator 101 used herein can be an ordinary ozone generator as long as it is configured to generate ozone gas from gas such as introduced air and oxygen. Gas-liquid mixing portion 102 includes an inlet port 108 through which a liquid such as water is introduced from outside of the ozone liquid generator; an inlet port 109 connected to a pipe line a and through which gas such as ozone gas and air is introduced; and an outlet port 110 connected to a pipe line b and through which a gas-liquid mixture obtained by mixing gas and a liquid flows out. The liquid such as water introduced through inlet port 108 is mixed with gas such as air and ozone gas introduced through inlet port 109, and caused to flow out through outlet port 110 as a gas-liquid mixture such as an ozone liquid.

The gas-liquid mixture used herein means a liquid containing air dissolved therein or a liquid containing gas as air bubbles. The ozone liquid used herein means a state where a liquid contains an ozone solution containing ozone gas dissolved therein or where a liquid contains an ozone bubble solution mixed with ozone gas as air bubbles. Furthermore, examples of a liquid to be mixed include a solution with which ozone gas is mixed, such as water, a culture nutrient solution utilized as a solvent for agriculture, and a solution utilized as a solvent for medical use.

Figure 2:
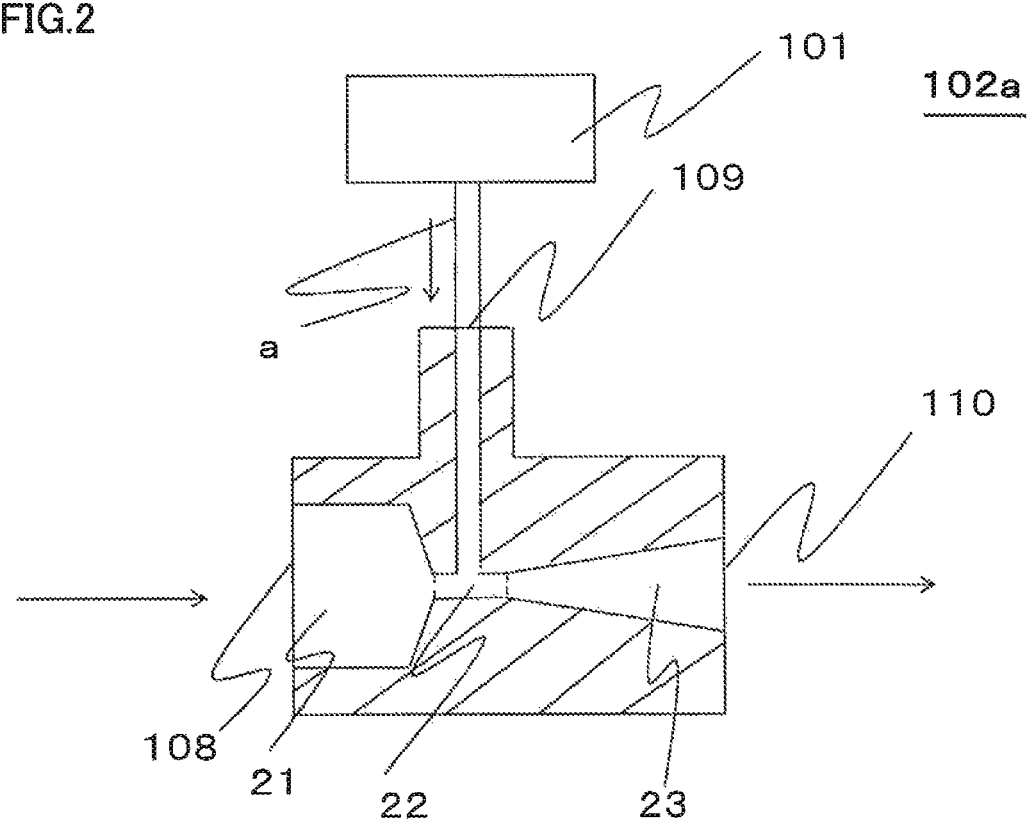
FIG. 2 is a schematic explanatory diagram of a gas-liquid mixing portion according to one embodiment of the present invention.

Details of one embodiment of the gas-liquid mixing portion will then be described with reference to FIG. 2. FIG. 2 is a schematic explanatory diagram of a venturi-type gas-liquid mixing portion. Venturi-type gas-liquid mixing portion 102a includes an inlet port 108 through which a liquid is introduced; an inlet path 21 in communication with inlet port 108; a communication path 22 in communication with inlet path 21 and smaller in diameter than inlet path 21; an outlet path 23 in communication with communication path 22 and larger in diameter than communication path 22; and an outlet port 110 in communication with outlet path 23. A liquid flows out through outlet port 110. Furthermore, communication path 22 includes an inlet port 109 opened in the middle of the path, and is connected to ozone generator 101 through pipe line a. The term "opened" used herein means that a hole or the like is provided on the side surface of the pipe line. The opening provided as a hole in the pipe line can be connected to other pipe lines so as to be in communication therewith. It is to be noted that the hole may be arbitrarily designed as appropriate to have any shape such as a circle, an ellipse and a polygon.

When a liquid is introduced from inlet port 108, the liquid having flowed through inlet path 21 and reached communication path 22 is introduced into a pipe narrower than inlet path 21. Accordingly, the flow velocity increases and the static pressure decreases, as known from Bernoulli's theorem. Consequently, the static pressure of the flowing liquid becomes a negative pressure, and gas is self-suctioned toward communication path 22 through pipe line a. Then, the introduced gas and liquid are mixed together to obtain a gas-liquid mixture, which flows out through outlet port 110 in communication with outlet path 23. In this case, when ozone gas is generated by ozone generator 101 and introduced, the introduced liquid and ozone gas are mixed together to generate an ozone liquid. Although an explanation has been herein given using a venturi-type gas-liquid mixing portion in FIG. 2 as one embodiment of the gas-liquid mixing portion, a gas-liquid mixing portion having any other configuration may be used as long as it can self-suction gas.

Figure 3:
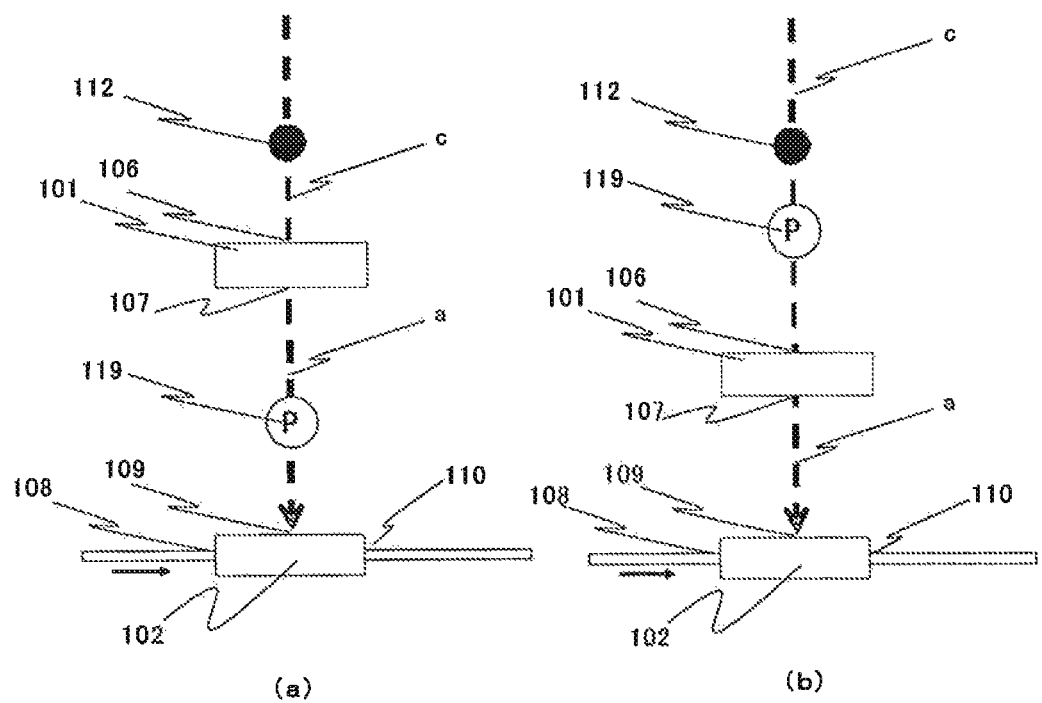
FIG. 3 is a schematic explanatory diagram of the gas-liquid mixing portion connected to a pipe line including a pumping portion according to one embodiment of the present invention.

Then, one embodiment of another gas-liquid mixing portion ill be described with reference to a schematic explanatory diagram showing, as in FIG. 3, that pipe line a or pipe line c is provided with a pumping portion and pipeline a or pipeline c is connected to gas-liquid mixing portion 102 incapable of self-suctioning gas. FIG. 3(a) shows one embodiment of a gas-liquid mixing portion connected to pipe line a provided with a pumping portion 119, FIG. 3(b) shows one embodiment of a gas-liquid mixing portion connected to pipe line c provided with pumping portion 119.

Pumping portion 119, which is formed of a pump or the like, allows gas to flow toward gas-liquid mixing portion 102 through a pipe line. Furthermore, since pumping portion 119 provided in the pipe line needs to have an ability to pump gas toward gas-liquid mixing portion 102, a pumping portion to be provided should have an ability to produce pumping pressure higher than the pressure applied from gas-liquid mixing portion 102 to pumping portion 119.

Accordingly, also when a gas-liquid mixing portion having no self-suctioning ability is disposed in the configuration in each of FIGS. 3(a) and 3(b), it becomes possible to introduce gas into gas-liquid mixing portion 102 through circulation path A and mix this gas with a liquid introduced from inlet port 108, as in the case of a gas-liquid mixing portion having a self-suctioning ability.

Liquid storage tank 103 is formed of a hermetically-sealable container and the like that can store a liquid and gas. Liquid storage tank 103 includes an inlet port 111 connected to pipe line b and through which a liquid is introduced; a liquid outlet port 112 through which a liquid such as water and an ozone liquid flows to the outside of the ozone liquid generator; and a gas outlet port 113 connected to pipe line c and through which gas such as air and ozone gas flows out. Liquid storage tank 103 has a lower layer in which the introduced liquid is stored and an upper layer in which gas such as air and ozone gas is stored, thereby allowing separation into gas and a liquid. Thus, this liquid storage tank 103 serves as gas-liquid separating means. A hermetically-sealable container used herein means a container not having a space physically hermetically-sealed, but having a space in which gas is enclosed by a liquid. In the state where gas can be enclosed within a container, this state is described as a hermetically-sealed state even though water always flows out through liquid outlet port 112.

For example, in liquid storage tank 103, when an ozone liquid is introduced through inlet port 111 of liquid storage tank 103, gas such as ozone gas and air contained as air bubbles in the ozone liquid is separated and stored in the upper layer of liquid storage tank 103 while an ozone solution made of a liquid having ozone gas dissolved therein is stored in the lower layer of liquid storage tank 103.

Furthermore, gas outlet port 113 is provided at a position higher in the gravity direction than the position of liquid outlet port 112 provided in liquid storage tank 103, and includes opening and closing control means 104 that controls opening and closing in accordance with the stored liquid amount of the liquid stored in liquid storage tank 103.

Opening and closing control means 104 generally serves as water level adjustment means for automatically adjusting the stored liquid amount in a tank and the like so as to be maintained within a specific range. Opening and closing control means 104 is designed such that the valve is switched to an opened state when the stored liquid amount is less than a specific amount, and the valve is switched to a closed state when the stored liquid amount exceeds the specific amount. Thus, according to opening and closing control means 104, when the amount of the liquid stored in liquid storage tank 103 exceeds a specific amount, gas outlet port 113 is switched from an opened state to a closed state, to prevent gas from flowing out through gas outlet port 113, thereby preventing liquid storage tank 103 from storing an amount of liquid exceeding a specific amount.

For example, even when an amount of liquid equal to or greater than the amount of liquid that can flow out through liquid outlet port 112 is introduced into inlet port 111 and the amount of liquid stored in liquid storage tank 103 gradually increases with time, the stored liquid amount in the liquid storage tank can be adjusted within a specific range. Accordingly, it becomes possible to prevent the liquid from overflowing gas outlet port 113. It is to be noted that liquid storage tank 103 may be formed in any ordinary shape such as a cylindrical shape, a polygonal column, a polyangular pyramid, and a conical shape. Furthermore, the size of liquid storage tank 103 can be adjusted as appropriate depending on its design, and a part of the pipe line may be expanded to form a liquid storage tank. In addition, although opening and closing control means 104 in FIG. 1 is provided within liquid storage tank 103, it may be disposed in pipe line c in circulation path A between gas outlet port 113 and gas introducing means 105.

Furthermore, in order to improve the efficiency of gas-liquid separation, liquid storage tank 103 may be provided with flow suppressing means such as a flow suppression plate at the position where the flow of the liquid introduced into liquid storage tank 103 is suppressed. When the liquid containing air bubbles and introduced into liquid storage tank 103 flows at high velocity from inlet port 111 to liquid outlet port 112, air bubbles contained in this liquid cannot be completely separated, so that the liquid still containing air bubbles may flow out through liquid outlet port 112. Accordingly, it is effective to suppress the velocity of the flow of the liquid within liquid storage tank 103 to improve the efficiency of gas-liquid separation.

Figure 4:
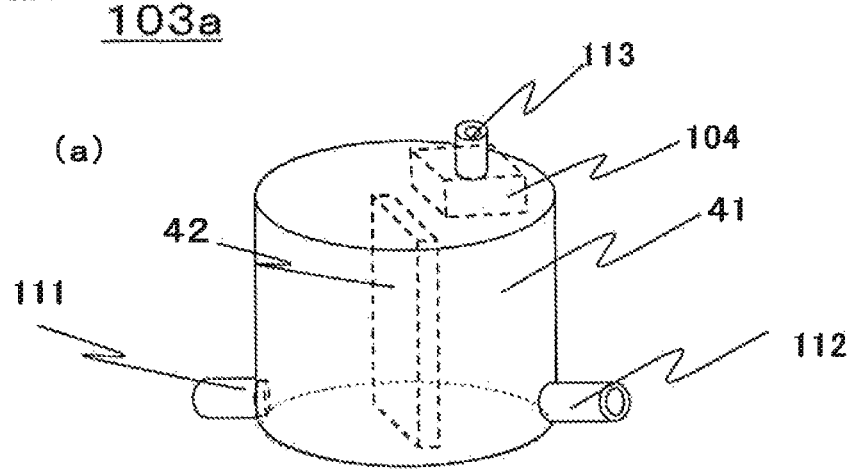
FIG. 4 is a schematic explanatory diagram of a liquid storage tank according to one embodiment of the present invention.
Figure 4:
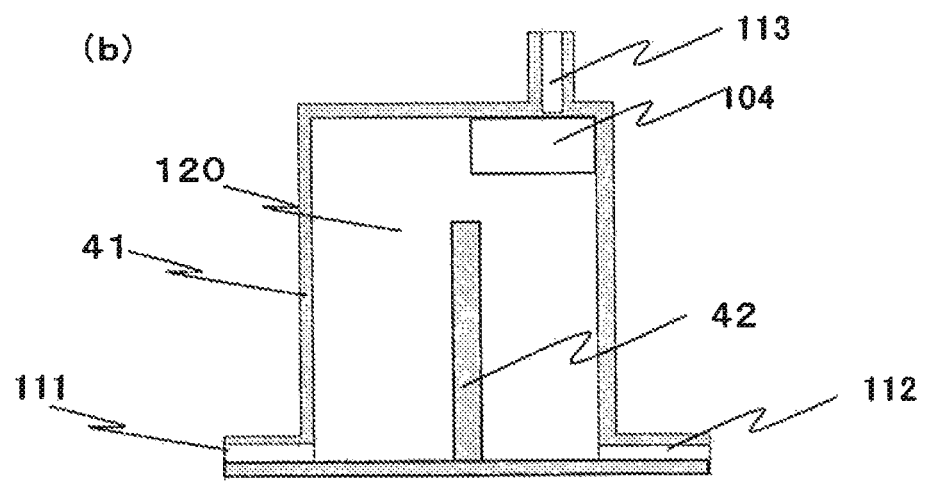

For example, as shown in FIG. 4, a liquid storage tank 103a having a flow suppression plate may be used within the container, thereby improving the efficiency of gas-liquid separation. FIG. 4 is a schematic explanatory diagram illustrating one embodiment of liquid storage tank 103a according to the present invention, showing a configuration in which flow suppressing means is provided at the bottom of liquid storage tank 103 in FIG. 1. FIG. 4(a) is a perspective view of liquid storage tank 103a. FIG. 4(b) is a schematic explanatory diagram of liquid storage tank 103a as seen in lateral view.

Liquid storage tank 103a in FIG. 4 has a container portion 12.0 that is surrounded by an outer wall 41 and can be hermetically sealed. Liquid storage tank 103a includes an inlet port 111 through which a liquid is introduced into container portion 120; a liquid outlet port 112 through which a liquid such as an ozone liquid flows out; a gas outlet port 113 through which gas flows out; and a flow suppression plate 42.

Gas outlet port 113 is provided at a position higher in the gravity direction than the position of liquid outlet port 112 provided in liquid storage tank 103a. Gas outlet port 113 includes opening and closing control means 104 that controls opening and closing in accordance with the amount of the liquid stored in liquid storage tank 103a. Although FIG. 4 schematically shows opening and closing control means 104 for illustrative purposes, it is possible to provide not only the opening and closing control means described in the present embodiment but also other opening and closing control means. Furthermore, it is preferable that gas outlet port 113 is provided near the ceiling of container portion 120 so as to cause gas to efficiently flow out therethrough, and liquid outlet port 112 is provided near the bottom of container portion 120 so as to cause a liquid to efficiently flow out therethrough.

Flow suppression plate 42 is disposed at the bottom of the container portion, and serves as flow suppressing means for suppressing the flow of the liquid introduced from inlet port 111. Although FIG. 4 shows a rectangular flow suppression plate 42, a flow suppression plate having a different shape such as a polygonal column, a polyangular pyramid and an arc-shaped wall may be provided as long as it can suppress the flow of the introduced liquid.

The liquid introduced through inlet port 111 collides with flow suppression plate 42, and the flow velocity of the liquid is suppressed. Then, this liquid is caused to flow out through liquid outlet port 112. Accordingly, since the introduced liquid remains within liquid storage tank 103a for a certain period of time, it becomes possible to effectively perform gas-liquid separation for separating gas such as ozone gas contained in the ozone liquid.

Figure 5:
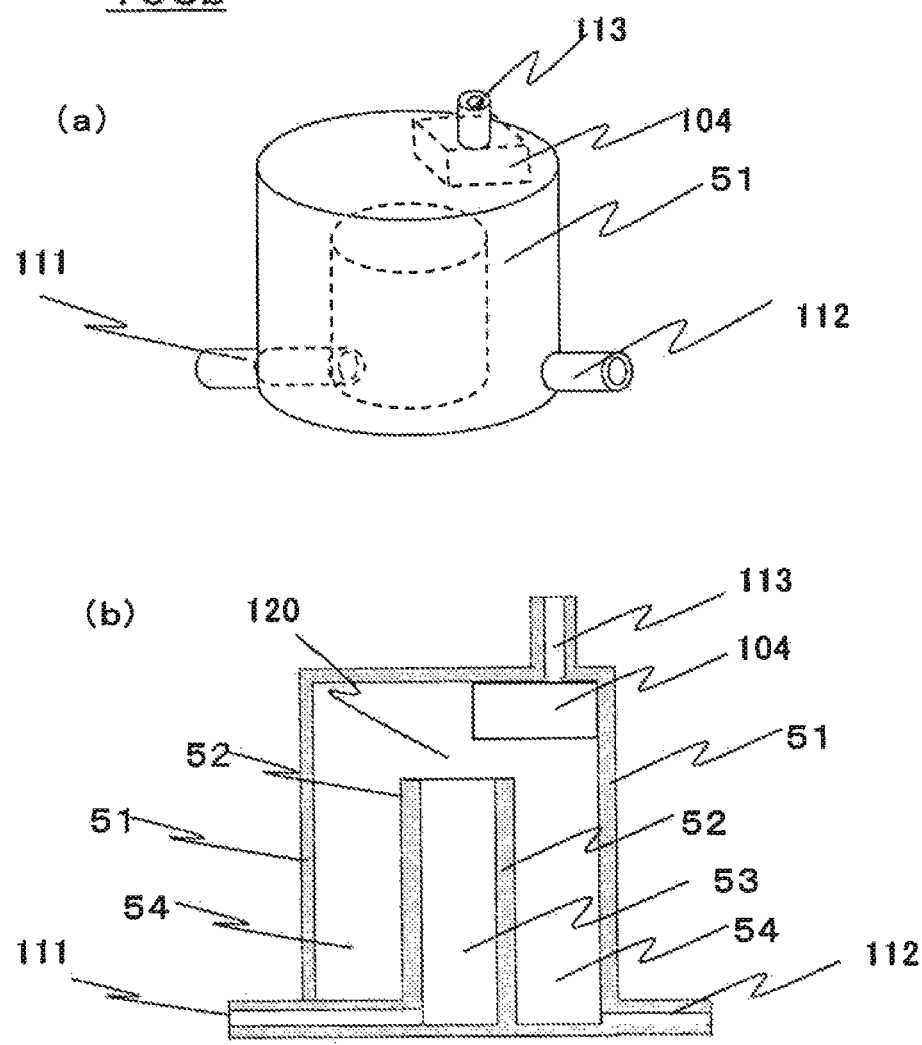
FIG. 5 is a schematic explanatory diagram of a liquid storage tank according to one embodiment of the present invention.

Furthermore, for example, liquid storage tank 103b having a double-pipe structured container as shown in FIG. 5 may be used to improve the efficiency of gas-liquid separation. FIG. 5 is a schematic explanatory diagram illustrating one embodiment of liquid storage tank 103b according to the present invention. FIG. 5(a) is a perspective view of liquid storage tank 103b. FIG. 5(b) is a schematic explanatory diagram of liquid storage tank 103b as seen in lateral view.

Liquid storage tank 103b in FIG. 5 has a container portion 120 surrounded by an outer wail 51 and storing a liquid and gas, and includes an inlet port 111 through which a liquid is introduced into container portion 120; a liquid outlet port 112 through which a liquid such as an ozone liquid flows out; and a gas outlet port 113 through which gas flows out. Furthermore, container portion 120 is formed as a double-pipe structure having an inner cylinder 53 that is in communication with inlet port 111 and formed by an inner wall 52, and an outer cylinder 54 that is formed between outer wail 51 and inner wall 52 and capable of storing a liquid. Gas outlet port 113 is provided at a position higher in the gravity direction than the height of the wail formed by inner wall 52. Liquid outlet port 112 is provided at a position lower in the gravity direction than the height of the wall formed by inner wall 52. In this case, it is preferable that gas outlet port 113 is provided near the ceiling of container portion 120 so as to cause gas to efficiently flow out while liquid outlet port 112 is provided near the bottom of container portion 120 so as to cause a liquid to efficiently flow out.

The liquid introduced through inlet port 111 is stored in inner cylinder 53 of container portion 120. When the level of the stored liquid eventually exceeds the wall height of inner wall 52 and overflows this inner wall 52, the liquid is to be stored in outer cylinder 54. Then, the liquid stored in outer cylinder 54 is to flow out through liquid outlet port 112. Accordingly, during the ozone liquid generation mode, in liquid storage tank 103b, a liquid is to be stored in the lower layer of container portion 120 while gas is to be stored in the upper layer of container portion 120. Consequently, in liquid storage tank 103b, the liquid can be introduced through inlet port 111 while the gas can be caused to flow out through gas outlet port 113. In addition, in liquid storage tank 103b, the flow of the liquid introduced through inlet port 111 is caused to collide with inner wall 52, and thereby interrupted. Then, the liquid is stored in inner cylinder 53, and thereafter caused to flow out through liquid outlet port 112. Accordingly, it becomes possible to more effectively perform gas-liquid separation for separating gas such as ozone gas contained in the ozone liquid.

In addition, although liquid outlet port 1 12 is provided at the bottom of liquid storage tank 103b in FIG. 5, liquid outlet port 112 may be provided at a portion of outer wall 51 located between the bottom of outer cylinder 54 and the upper portion of inner wall 52 such that the ozone liquid can be stored in outer cylinder 54.

Gas outlet port 113 is provided at a position higher in the gravity direction than the position of liquid outlet port 112 provided in liquid storage tank 103b, and includes opening and closing control means 104 that controls opening and closing in accordance with the amount of the liquid stored in liquid storage tank 103b. Although FIG. 5 schematically shows opening and closing control means 104 for illustrative purposes, it is possible to provide not only the opening and closing control means described in the present embodiment but also other opening and closing control means.

Although liquid storage tank 103b formed to have a double-pipe structure has been described in FIG. 5, it does not need to be configured to have a cylindrical shape, but may be configured to have a double structure such as a polygon, and may be configured to have any other structure as long as it can separate gas and a liquid.

Then, details of one embodiment of a liquid storage tank including opening and closing control means will be hereinafter described with reference to the schematic explanatory diagram in FIG. 6. FIG. 6(a) is a top view of liquid storage tank 103. FIG. 6(b) is a schematic explanatory diagram of liquid storage tank 103 as seen in lateral view. Liquid storage tank 103 in FIG. 6 includes a container portion 120 capable of storing a liquid and gas in a hermetically-sealing manner. This liquid storage tank 103 has an inlet port 111 through which a liquid is introduced into container portion 120; a liquid outlet port 112 through which a liquid flows out; a gas outlet port 113 through which gas flows out; and opening and closing control means 104a.

Container portion 120 is designed such that approximately 3 L/min of water flow is introduced through the inlet port into a hermetically-sealable container, for example, formed in a cylindrical shape having a diameter of about 30 to 80 mm and a height of about 100 to 300 mm. Gas outlet port 113 is provided at a position higher in the gravity direction than the position of liquid outlet port 112, and includes opening and closing control means 104a that can control opening and closing in accordance with the liquid level in liquid storage tank 103.

Figure 6:
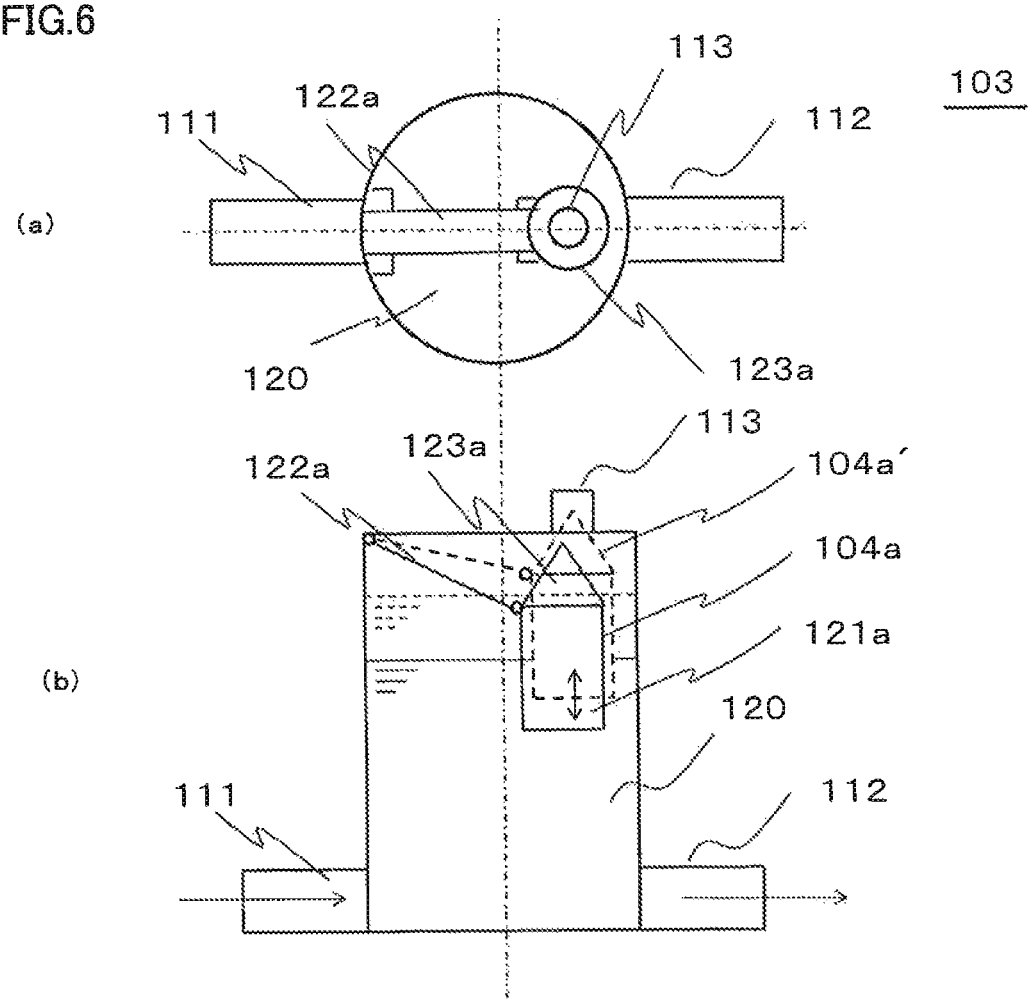
FIG. 6 is a schematic explanatory diagram of a liquid storage tank according to one embodiment of the present invention.

Opening and closing control means 104a in FIG. 6 is formed as a float valve 104a that can control opening and closing in accordance with the level of the liquid stored in the liquid storage tank. Opening and closing control means 104a in FIG. 6 will be hereinafter referred to as a float valve 104a.

The float valve used herein means a valve utilizing the buoyancy allowing an object made of a substance lower in specific gravity than a liquid and a hollow object to float in a liquid, to move the object floating in the liquid up and dawn, thereby switching between an opened state and a closed state. The float valve =generally serves as water level adjustment means for automatically adjusting the level of the liquid stored in a tank an the like so as to be maintained within a specific range.

Float valve 104a in FIG. 6 is formed of a float 121a, a float guide 122a and a float plug 123a. Float 121a is formed of an object made of a substance having a specific gravity value smaller than that of the liquid stored in the liquid storage tank, a hollow object or the like. This float 121a floating in the liquid stored in the liquid storage tank moves up and down according to the height of the liquid level. Float 121a moves up according to rise in the liquid level, and moves down according to fall in the liquid level.

Float plug 123a, which is connected to float 121a, is formed in a conical shape, a cylindrical shape, a prism shape, a spherical shape, a plate shape, a disk shape, and the like such that it is brought into contact with gas outlet port 113 and serves as a plug blocking a flow path. It is to be noted that float valve 104a may be provided by connecting float 121a and float plug 123a that are separately formed or by forming float 121a and float plug 123a in an integrated manner. For example, float plug 123a may be formed of an object made of a substance having a specific gravity value smaller than that of the liquid stored in the liquid storage tank, a hollow object or the like, so that float plug 123a can play both roles of a plug blocking the flow path and float 121a.

Float guide 122a is formed in the shape of a bar line, a flat plate, a strap and the like, and has one end connected to container portion 120a and the other end connected to float 121a or float plug 123a. Float guide 122a is provided such that float 121a moves up according to rise in the level of the liquid stored in the liquid storage tank to cause float plug 123a to block gas outlet port 113, and also such that float 121a moves down according to fall in the level of the liquid to thereby eliminate blockade of gas outlet port 113.

Accordingly, when the level of the liquid stored in liquid storage tank 103 is lower than a specific level, gas outlet port 113 is brought into an opened state. When the liquid is stored in liquid storage tank 103 and the liquid level is higher than the specific level, gas outlet port 113 is blocked by float valve 104a and brought into a closed state.

For example, FIG. 6 shows float valve 104a including float 121a having a cylindrical shape and float plug 123a having a conical shape, in which a solid line shows float valve 104a at the time when the stored liquid amount in the liquid storage tank is relatively tow and gas outlet port 113 is in an opened state; and a dashed line shows a float valve 104a' at the time when the stored liquid amount in the liquid storage tank is relatively high and gas outlet port 113 is blocked and in a closed state.

When the level of the liquid stored in liquid storage tank 103 exceeds a specific amount, float valve 104a switches gas outlet port 113 from the opened state to the closed state, thereby preventing gas or a liquid exceeding a specific amount from overflowing through gas outlet port 113. Accordingly, float valve 104a can be operated even if a liquid level sensor, a control circuit, a solenoid valve and the like are not provided. Also, even by its low-cost and small-scale configuration, float valve 104a by itself can control adjustment of the level of the liquid stored in liquid storage tank 103.

In addition, liquid storage tank 103 may he formed in any ordinary shape such as a cylindrical shape, a polygonal column, a polyangular pyramid, and a conical shape, and may also be provided with an apparatus and a mechanism for improving the efficiency of separation into gas and a liquid. Furthermore, it is preferable that liquid outlet port 112 is provided near the bottom of the container portion so as to suppress an overflow of gas such as ozone gas and air as air bubbles. Furthermore, the outlet port may be provided in the direction in which a liquid is introduced into the center area or in the direction in which a liquid is introduced in the circumferential direction. It is preferable that gas outlet port 113 is provided near the ceiling of the container portion so as to allow gas to efficiently flow out.

Furthermore, although FIG. 6 shows a float valve for illustrating that float 121a moves up according to rise in the liquid level to block the flow path of gas outlet port 113 within liquid storage tank 103, the float valve is not limited thereto, but another float valve may be provided.

Then, details of one embodiment of the liquid storage tank including another opening and closing control means will be hereinafter described with reference to the schematic explanatory diagram in FIG. 7. FIG. 7(a) is a top view of liquid storage tank 103. FIG. 7(b) is a schematic explanatory diagram of liquid storage tank 103 as seen in lateral view.

Figure 7:
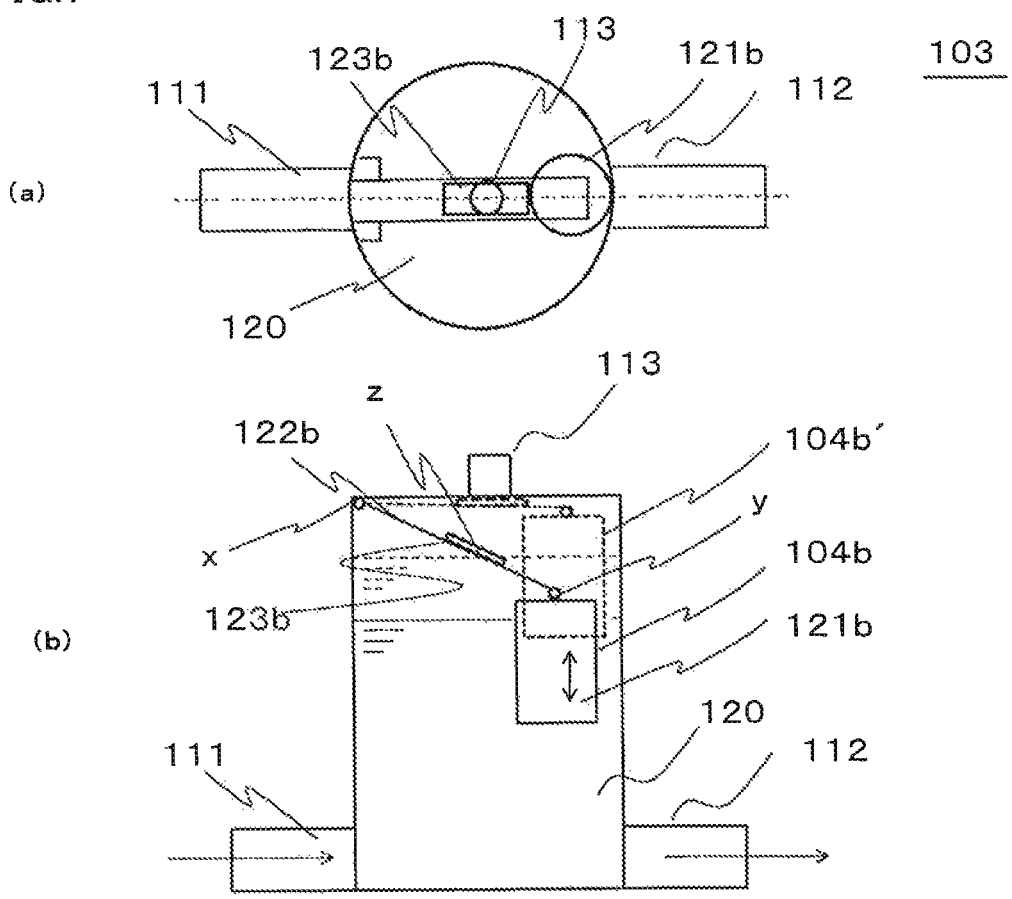
FIG. 7 is a schematic explanatory diagram of a liquid storage tank according to one embodiment of the Present invention.

Liquid storage tank 103 in FIG. 7 includes a container portion 120 capable of storing a liquid and gas in a hermetically-sealing manner. Liquid storage tank 103 has an inlet port 111 through which a liquid is introduced into container portion 120; a liquid outlet port 112 through which a liquid flows out; a gas outlet port 113 through which gas flows out; and opening and closing control means 104b. Since the liquid storage tank in FIG. 7 includes the same components as those in FIG. 6 except for opening and closing control means 104b, the same components are designated by the same reference characters, and detailed description thereof will not be repeated.

Opening and closing control means 104b in FIG. 7 is formed as a float valve 104b that can control opening and closing in accordance with the level of the liquid stored in the liquid storage tank. Opening and closing control means 104b in FIG. 7 will be hereinafter referred to as a float valve 104b.

Float valve 104b is formed of a float 121b, a float guide 122b and a float plug 123b.

Float 121b is formed of an object made of a substance having a specific gravity value smaller than that of the liquid stored in the liquid storage tank, a hollow object or the like. This float 121a floating in the liquid stored in the liquid storage tank moves up and down according to the height of the liquid level. Float 121a moves up according to rise in the liquid level, and moves down according to fall in the liquid level.

Float plug 123b is formed in a conical shape, a cylindrical shape, a prism shape, a spherical shape, a plate, a disk, and the like such that it is brought into contact with gas outlet port 113 and serves as a plug blocking a flow path.

Float guide 122b is formed in the shape of a bar line, a flat plate and the like, and has one end connected to container portion 120 and the other end connected to float 121b. Furthermore, float guide 122b is provided with a float plug 123b in a part of the connection or in the entire connection between the connecting point to container portion 120 and the connecting point to float 121b, such that float 121b moves up according to rise in the level of the liquid stored in the liquid storage tank to cause float plug 123b to block gas outlet port 113. In this case, float 121b does not have to be provided at the end of float guide 122b, but may be connected to float 121b in the middle of float guide 122.

Thus, when the level of the liquid stored in liquid storage tank 103 is lower than a specific liquid level, gas outlet port 113 is brought into an opened state. When the liquid is stored in liquid storage tank 103 to the level equal to or higher than the specific liquid level, gas outlet port 113 is blocked by float valve 104b, and brought into a closed state.

It is to be noted that float valve 104b may be provided by connecting float guide 122b and float plug 123b that are separately formed or by forming float guide 122b and float plug 123b in an integrated manner. For example, float guide 122b may he formed of a material having elasticity like rubber capable of blocking gas outlet port 113, so that float guide 122b can play both roles of float guide 122b and float plug 123b blocking the flow path.

For example, FIG. 7 shows float valve 104b including cylindrical float 121b, plate-shaped float guide 122b and plate-shaped float plug 123b, in which a solid line shows float valve 104b at the time when the height of the liquid level in the liquid storage tank is relatively low and gas outlet port 113 is in an opened state while a dashed line shows a float valve 104b' at the time when the height of the liquid level is relatively high and gas outlet port 113 is blocked and in a closed state.

Accordingly, when the level of the liquid stored in liquid storage tank 103 exceeds a specific height, float valve 104b switches gas outlet port 113 from the opened state to the closed state, thereby preventing gas or a liquid exceeding a specific amount from overflowing through gas outlet port 113.

Furthermore, by applying the principle of leverage, float valve 104b in FIG. 7 can block gas outlet port 113 with relatively higher pressing force. The principle of leverage can be applied by setting the connecting point between float guide 122b and container portion 120 as a fulcrum x; the connecting point between float guide 122b and float 121b as an effort point y; and a contact portion z of float plug 123b at which float plug 123b and gas outlet port 113 are in contact with each other as a point of action z. Accordingly, since relatively small float 121b capable of achieving only low buoyancy is utilized to allow the outlet port to be closed, it becomes possible to save the space of float valve 104b. In order to more effectively utilize the principle of leverage, it is preferable that float 121b serving as an effort point y is disposed as far away as possible from fulcrum x, and for example, preferable that float 121b is provided at the end of float guide 122b. Furthermore, since it is preferable that float plug 123b serving as a point of action z is disposed as near as possible from fulcrum x, it is also preferable that gas outlet port 113 and float plug 123b are disposed as near as possible from fulcrum x.

Figure 8:
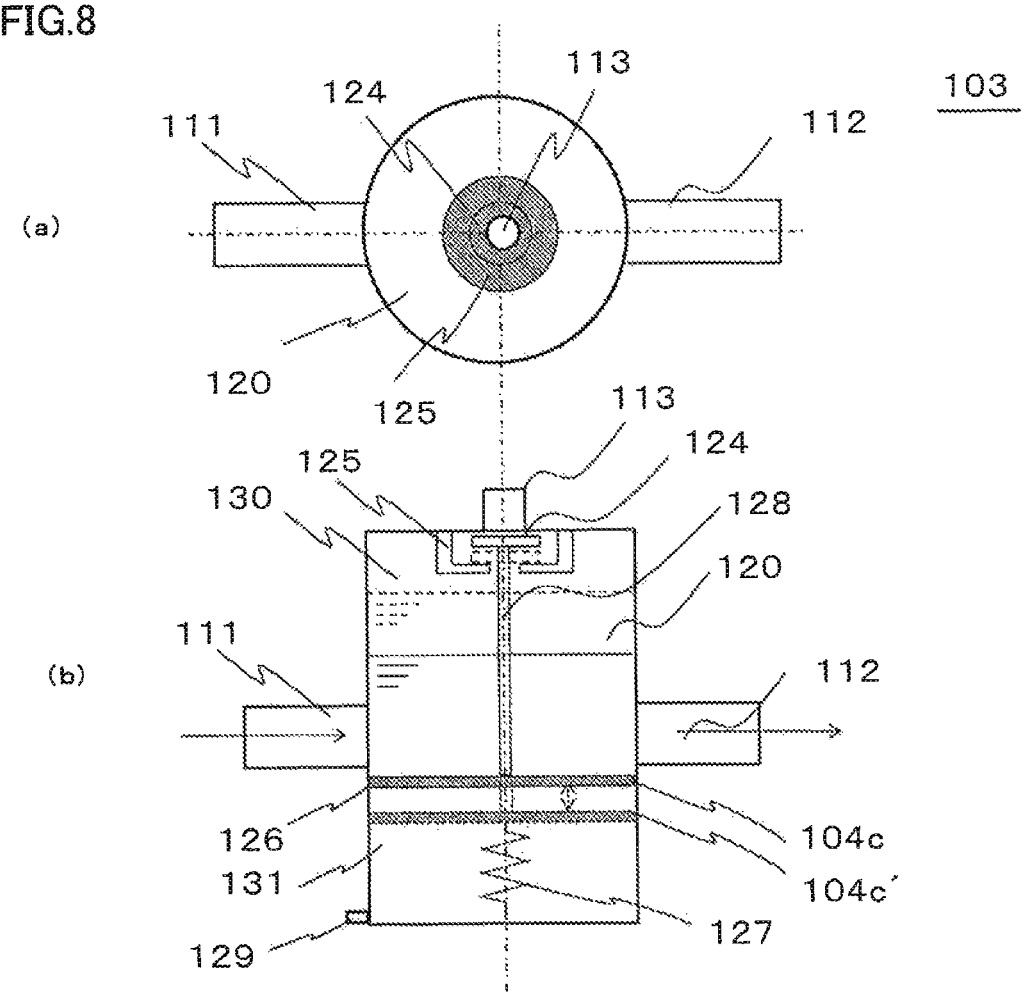
FIG. 8 is a schematic explanatory diagram of a liquid storage tank according to one embodiment of the present invention.

Then, details of one embodiment of the liquid storage tank including another opening and closing control means will be hereinafter described with reference to the schematic explanatory diagram in FIG. 8. FIG. 8(*a*) is a top view of liquid storage tank 103. FIG. 8(*b*) is a schematic explanatory diagram of liquid storage tank 103 as seen in lateral view. Liquid storage tank 103 in FIG. 8 includes a container portion 120 capable of storing a liquid and gas in a hermetically-sealing manner. This liquid storage tank 103 has an inlet port 111 through which a liquid is introduced into container portion 120; a liquid outlet port 112 through which a liquid flows out; a gas outlet port 113 through which gas flows out; and opening and closing control means 104c.

Gas outlet port 113 is provided at a position higher in the gravity direction than the position of liquid outlet port 112, and includes self-weight opening and closing control means 104c that can control opening and closing in accordance with the liquid level in liquid storage tank 103.

Self-weight opening and closing control means 104c in FIG. 8 is formed as self-weight opening and closing control means 104c for opening and closing the gas outlet port by the weight of the liquid stored in the container portion. Opening and closing control means 104c in FIG. 8 will be hereinafter referred to as self-weight opening and closing control means 104c.

The self-weight opening and closing control means is a valve that utilizes the gravity of the liquid stored in the container movable in the gravity direction, to switch between the opened state and the closed state such that the outlet port is opened when the stored liquid amount is lower than a specific amount while the outlet port is closed when the stored liquid amount is equal to or greater than the specific amount. The self-weight opening and closing control means generally serves as stored liquid amount adjustment means for automatically adjusting the level of the liquid stored in a tank and the like so as to be maintained within a specific range.

Self-weight opening and closing control means 104c in FIG. 8 includes a partition plate 126 partitioning container portion 120 in the gravity direction; a support portion 128 connected to partition plate 126; a self-weight plug 124 connected to support portion 128; a blocking portion 125 that is brought into close contact with self-weight plug 124, thereby blocking the flow path of gas outlet port 113 and bringing about a closed state; and elastic means 127 for moving partition plate 126 in the gravity direction in accordance with the magnitude of the gravity received by partition plate 126.

Partition plate 126 has a shape similar to the cross-sectional shape of container portion 120, is formed of a material having elasticity of rubber and the like, and serves to separate container portion 120 into two spaces. A first storage chamber 130 located above partition plate 126 in the gravity direction is provided with an inlet port 111, a liquid outlet port 112 and a gas outlet port 113 so as to provide a configuration in which a liquid is introduced and stored therein. On the other hand, a second storage chamber 131 located below partition plate 126 in the gravity direction is provided with elastic means 127 that presses partition plate 126 with specific pressure.

Furthermore, partition plate 126 has a function as a gasket capable of moving up and down along container portion 120. For example, partition plate 126 may be formed in the shape of a disk, and have an outer circumferential portion that is in contact with container portion 120 and made of a material such as rubber having elasticity. In addition, the space accommodating elastic means 127 may be provided with a vent 129 so as to allow partition plate 126 to move up and down in a flexible manner.

Support portion 128 is formed in the shape of a bar line or a strap, and has one end connected to partition plate 126 and the other end connected to self-weight plug 124, thereby causing self-weight plug 124 to move up and down in accordance with movement of partition plate 126.

Blocking portion 125 is configured such that gas outlet port 113 in communication with container portion 120 is surrounded by a cylindrical container. This cylindrical container is provided with a hole in communication with container portion 120. Furthermore, blocking portion 125 having self-weight plug 124 housed therein is configured such that vertical movement of self-weight plug 124 causes the hole of blocking portion 125 to he brought into close contact with self-weight plug 124, thereby allowing blockage of the flow path of gas outlet port 113. In addition, the shape of blocking portion 125 is not limited to a cylindrical shape, but may be any shape such as a conical shape, a polygonal column and a polyangular pyramid, and may have any configuration as long as blocking portion 125 and self-weight plug 124 can block the flow path to gas outlet port 113. Furthermore, self-weight plug 124 only needs to have a shape allowing blockage of the hole provided in blocking portion 125, and is not limited to a disk shape, but may be formed in any other shape such as a plate shape and a spherical shape.

For example, FIG. 8 shows a configuration in which self-weight plug 124 in the shape of a disk blocks the hole provided in cylindrical blocking portion 125. Thus, when self-weight plug 124 moves down in the gravity direction, the hole in blocking portion 125 is blocked. When self-weight plug 124 moves up in the gravity direction, the hole in blocking portion 125 is unblocked.

Elastic means 127 is formed of a spring and the like. Elastic means 127 is connected to the bottom of container portion 120 and partition plate 126, and produces specific pressing force as repulsive force against partition plate 126. In place of elastic means 127 like a spring, it is also preferable to employ such a phenomenon that partition plate 126 moves up and down in the gravity direction by compression of gas in accordance with the pressing force from first storage chamber 130 against partition plate 126 in the state where second storage chamber 131 is hermetically sealed.

FIG. 8 illustrates self-weight opening and closing control means 104c, in which a solid line shows self-weight opening and closing control means 104c at the time when the stored liquid amount in the liquid storage tank is relatively light in weight and gas outlet port 113 is in an opened state, while a dashed line shows self-weight opening and closing control means 104c" at the time when the stored liquid amount in the liquid storage tank is relatively heavy in weight and gas outlet port 113 is blocked and in a closed state.

Accordingly, when the weight of the liquid in quid storage tank 103 exceeds a specific weight, self-weight opening and closing control means 104c switches gas outlet port 113 from the opened state to the closed state, thereby preventing gas or a liquid exceeding the specific amount from overflowing through gas outlet port 113. Accordingly, self-weight opening and closing control means 104c can operate even without having a weight sensor, a control circuit, a solenoid valve or the like, and also, can control adjustment of the amount of the liquid stored in liquid storage tank 103 by itself in its low-cost and small-scale configuration.

When the amount of the liquid stored in liquid storage tank 103 is lower than a specific stored liquid amount, gas outlet port 113 is brought into an opened state. When the amount of the liquid stored in liquid storage tank 103 is higher than the specific stored liquid amount, gas outlet port 113 is brought into a closed state, in addition, liquid storage tank 103 may be formed in any ordinary shape such as a cylindrical shape, a polygonal column, a polyangular pyramid, and a conical shape, and also, may be provided with an apparatus and a mechanism for improving the efficiency of separating a gas-air mixture into gas and a liquid.

Furthermore, it is preferable that liquid outlet port 112 is provide near the bottom of the container portion so as to suppress an overflow of gas such as ozone gas and air as air bubbles. It is preferable that gas outlet port 113 is provided at and near the ceiling of the container portion so as to allow gas to efficiently flow out. In addition, self-weight opening and closing control means 104c in FIG. 8 is not limited to the configuration in FIG. 8, but may have any configuration as long as it can control opening and closing by utilizing the gravity of the liquid stored in the container.

Circulation path A is formed of a piping system including a hose, a pipe and the like. Circulation path A includes a pipe line a connecting between outlet port 107 of ozone generator 101 and inlet port 111 of gas-liquid mixing portion 102; a pipe line b connecting between outlet port 110 of gas-liquid mixing portion 102 and inlet port 111 of liquid storage tank 103; and a pipe line c connecting between gas outlet port 113 of liquid storage tank 103 and inlet port 106 of ozone generator 101.

Pipe line c includes an opening 114 opened in the middle of the path, and is connected to gas introducing means 105 for controlling introduction of us from outside of the ozone liquid generator to inside thereof, Gas introducing means 105 is formed of a pipe lined provided with a first check valve 115. Pipe line d has one end connected in communication with an opening 114 opened in the middle of the path of pipe line c, and the other end provided with an external port 116 in communication with a gas cylinder and the like storing atmospheric air or oxygen and air.

The check valve used herein is a control valve that is attached to a pipe line and the like through which a fluid such as gas and a liquid flows, and used for stopping the flow of the fluid in the direction opposite to a specific direction. The pipe line provided with this check valve allows a fluid to flow only in one direction. Accordingly, pipe line d provided with first check valve 115 causes gas to flow only in one direction from external port 116 to pipe line a, thereby preventing gas from being released from the circulation path to the outside.

Although gas introducing means 105 is attached to pipe line d connecting liquid storage tank 103 and ozone generator 101, the position to which gas introducing means 105 is attached is not limited thereto. Gas introducing means 105 may be attached to pipe line a between ozone generator 101 and mixing portion 102.

Gas introducing means 105 only has to he means for allowing introduction of gas from outside of the ozone liquid generator to inside thereof, and may be configured to have a check valve without the pipe line passing through opening 114. In place of the cheek valve, gas introducing means 105 may also be formed of an opening and closing valve capable of controlling introduction into the ozone liquid generator, an electronically-controllable solenoid valve, and the like.

Furthermore, pipe line d may include an ozone filter 117 having a function of reducing ozone gas. Since ozone filter 117 can decompose the ozone gas passing through the filter, gas can be safely released through external port 116. Accordingly, also when first check valve 115 is corroded by ozone gas and thereby damaged, it is possible to prevent the ozone gas within ozone water generator 100 from leaking to the outside space. In addition, ozone filter 117 may be an ordinary ozone filter, for example, obtained by attaching an ozone decomposition catalyst to paper or aluminum formed in a arid pattern.

Furthermore, pipe line c may be provided with a second check valve 118 between inlet port 111 of liquid storage tank 103 and opening 114. Since second check valve 118 is provided so as to cause gas to flow from gas outlet port 113 toward opening 114, the gas introduced through external port 116 can be prevented from entering through pipe line c from gas outlet port 113 of liquid storage tank 103. Accordingly, the operation of the opening and closing control means can be stabilized by second check valve 118, so that the gas suctioned through external port 116 can be reliably introduced through inlet port 111 of liquid storage tank 103 for adjusting the liquid level.

<<Description of Operation>>

Then, the operation of the ozone liquid generator according to the present invention will be hereinafter described with reference to FIGS. 1 to 13. For the purpose of simplifying the description, air and water are used as gas and a liquid, respectively, to generate ozone water in the description. In order to generate an ozone solution, however, oxygen or the like may be used as gas in addition to air, and any other solution may be used as a liquid in addition to water as long as ozone gas can be dissolved therein.

Figure 9:
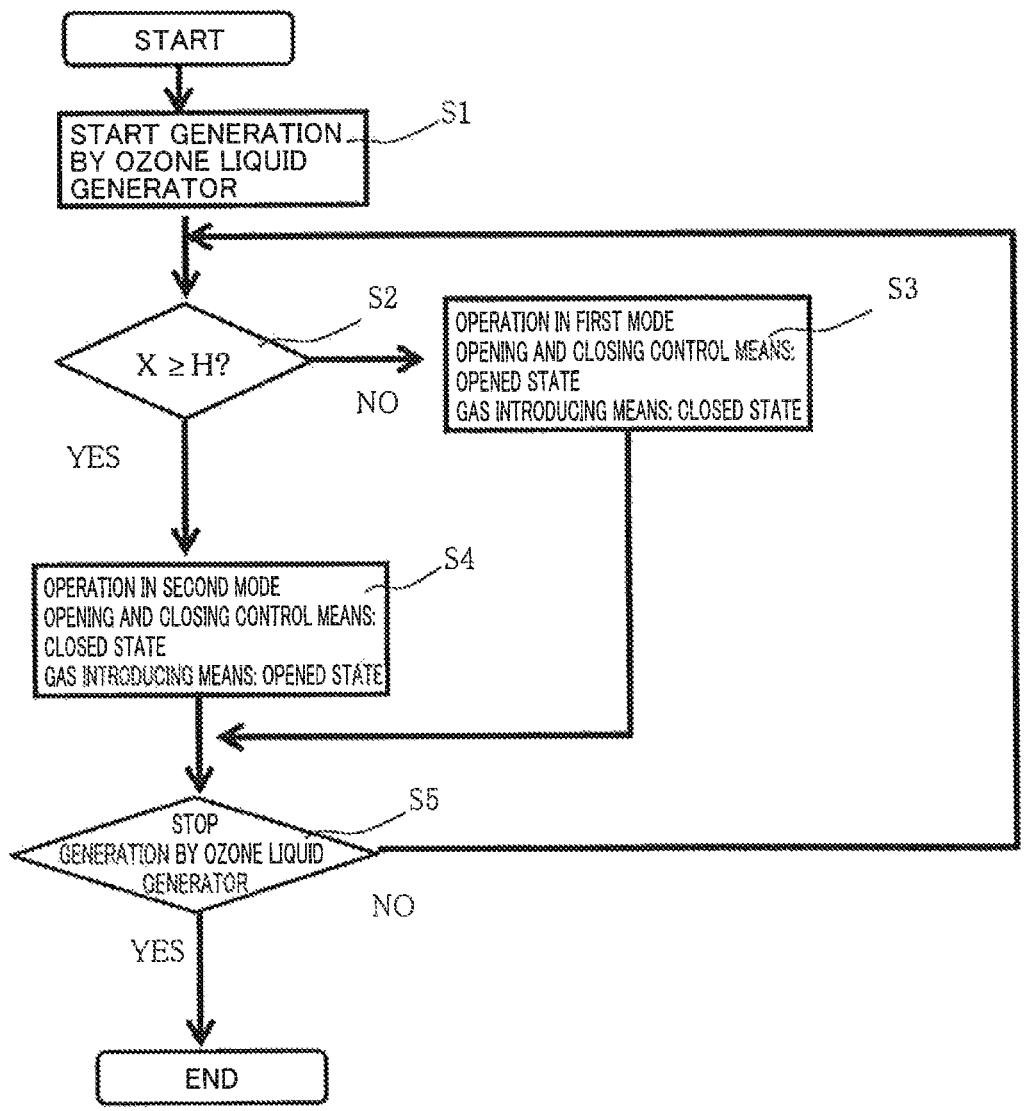
FIG. 9 is a flowchart of the ozone liquid generator according to one embodiment of the present invention.

FIG. 9 is a flowchart of an ozone liquid generator according to the present invention. The ozone liquid generator according to the present invention performs the operation in the first mode and the operation in the second mode as shown in FIG. 9. In this case, in accordance with an increase or a decrease in a stored liquid amount X showing a value of the amount of the liquid stored in liquid storage tank 103, the operation mode is switched using a predetermined specific value H as a threshold value, as described below.

In S1 shown in FIG. 9, water is introduced into gas-liquid mixing portion 102 and ozone generator 101 is turned ON, to start generation of an ozone liquid. In this case, liquid storage tank 103 starts generation in the state where a stored liquid amount X of the already stored liquid is equal to zero or less than a value H. In addition, the flow rate of water introduced into gas-liquid mixing portion 102 is greater than the amount of the liquid flowing out through liquid outlet port 112 of liquid storage tank 103. Accordingly, stored liquid amount X of the liquid stored in liquid storage tank 103 is to increase with time.

Then, it is confirmed in S2 whether stored liquid amount X of the liquid stored in liquid storage tank 103 is equal to or greater than specific value H determined in advance. In this case, specific value H is set to be lower than the stored liquid amount that can be stored in liquid storage tank 103 when it should be set o prevent a liquid from overflowing the liquid storage tank.

Furthermore, for example, in the case where liquid storage tank 103 is provided with, as opening and closing control means 104, control means capable of automatically opening and closing by itself such as a float valve illustrated in FIGS. 6 and 7 and self-weight opening and closing control means illustrated in FIG. 8, the value of the stored liquid amount at the time when opening and closing control means 104 is closed is set as a specific value H. At this time, opening and closing control means 104 will automatically compare stored liquid amount X and specific value H.

In addition, when opening and closing control means 104 is formed as a solenoid valve, an ordinary water level sensor and weight sensor such as a differential water level sensor and a level sensor may be used to sense the amount of the liquid stored in liquid storage tank 103, and compare this sensed stored liquid amount X and specific value H.

In S2, when stored liquid amount X is smaller than specific value H, the process proceeds to S3, and an ozone liquid is generated in the first mode. The first mode used herein means an internal gas circulation mode for generating an ozone liquid by circulating gas through circulation path A of the ozone liquid generator in the state where opening and closing control means 104 is in an opened state and gas introducing means 105 is in a closed state, in S3, the operation is carried out in this first mode, and the process proceeds to S5.

On the other hand, in S2, when stored liquid amount X is equal to or greater than specific value H, the process proceeds to S4, in which the operation is carried out in the second mode. The second mode used herein means an external gas introduction mode for introducing gas from outside of the ozone liquid generator through gas introducing means 105 in the state where opening and closing control means 104 is in a closed state and gas introducing means 105 is in an opened state. In S4, the operation is carried out in this second mode, and the process proceeds to S5.

For example, in the case where the ozone liquid generator includes opening and closing control means 104 capable of automatically opening and closing by itself such as a float valve illustrated in FIGS. 6 and 7 and self-weight opening and closing control means illustrated in FIG. 8; and gas introducing means 105 including a check valve, the operation mode can be mechanically switched without having to perform electronic control.

The flow of gas or a liquid is automatically interrupted when stored liquid amount X in liquid storage tank 103 reaches specific value H. Accordingly, stored liquid amount X does not exceed specific value H, so that the liquid can be prevented from flowing out through gas outlet port 113 of liquid storage tank 103.

In S5, it is confirmed whether generation of an ozone liquid is to be stopped or not. When generation of an ozone liquid is stopped in S5, introduction of the liquid is stopped, and the power supply of ozone generator 101 is turned OFF, to stop the ozone liquid generator. In this case, in order to stop generation by the ozone liquid generator, the end time may be programmed in advance, and for example, the operation may be programmed to select to stop generation of an ozone liquid when a specific period of time has passed since start of the generation. Furthermore, the operation may be programmed to stop the generation in accordance with the generated amount of the ozone liquid, and for example, may be programmed to sense the amount of the ozone liquid generated by the ozone liquid generator, and select to stop generation of the ozone liquid when the generated amount of the ozone liquid becomes equal to or greater than a specific amount. Furthermore, the ozone liquid generator may be configured such that a manually instructed selection to stop generation of an ozone liquid is confirmed, and then, the generation is stopped.

When the ozone liquid generator is not stopped in S5, the process again returns to S2, in which the above-described operation is repeated until the ozone liquid generator is stopped in S5. Accordingly, stored liquid amount X of the liquid stored in liquid storage tank 103 is controlled to be lower than specific value H from the time when the ozone liquid generator starts to generate an ozone liquid until the time when this generation is stopped.

In addition, the process in S5 of stopping generation by the ozone liquid generator can also be manually performed in any steps in the flowchart. For example, as in the flowchart in FIG. 10, the process may be set such that steps S2 and S3 and steps S2 and S4 are alternately repeated from the time when generation by the ozone liquid generator is started until the time when the operation is stopped manually. In this case, the process is controlled to return to step S2 after step S4 is performed, and also controlled to return to step S2 after step S3 is performed. Accordingly, the ozone liquid generator is operated alternately switching between the first mode and the second mode until generation of an ozone liquid is stopped.

In the case where each component is electrically controlled based on the above-described flowchart, opening and closing control means 104 and gas introducing means 105 each may be thrilled as a solenoid valve, and control means may be provided for controlling an instruction to control opening and closing of the solenoid valve, and an instruction to start or stop each component.

Figure 10:
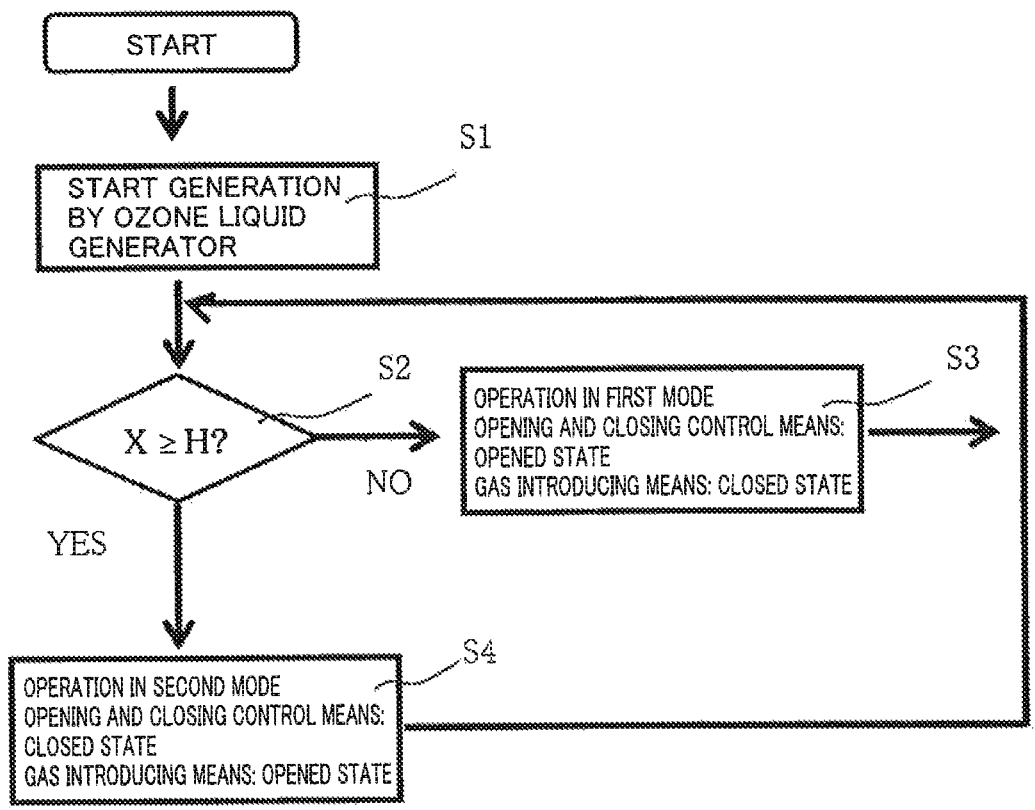
FIG. 10 is a flowchart of the ozone liquid generator according to one embodiment of the present invention.
Figure 11:
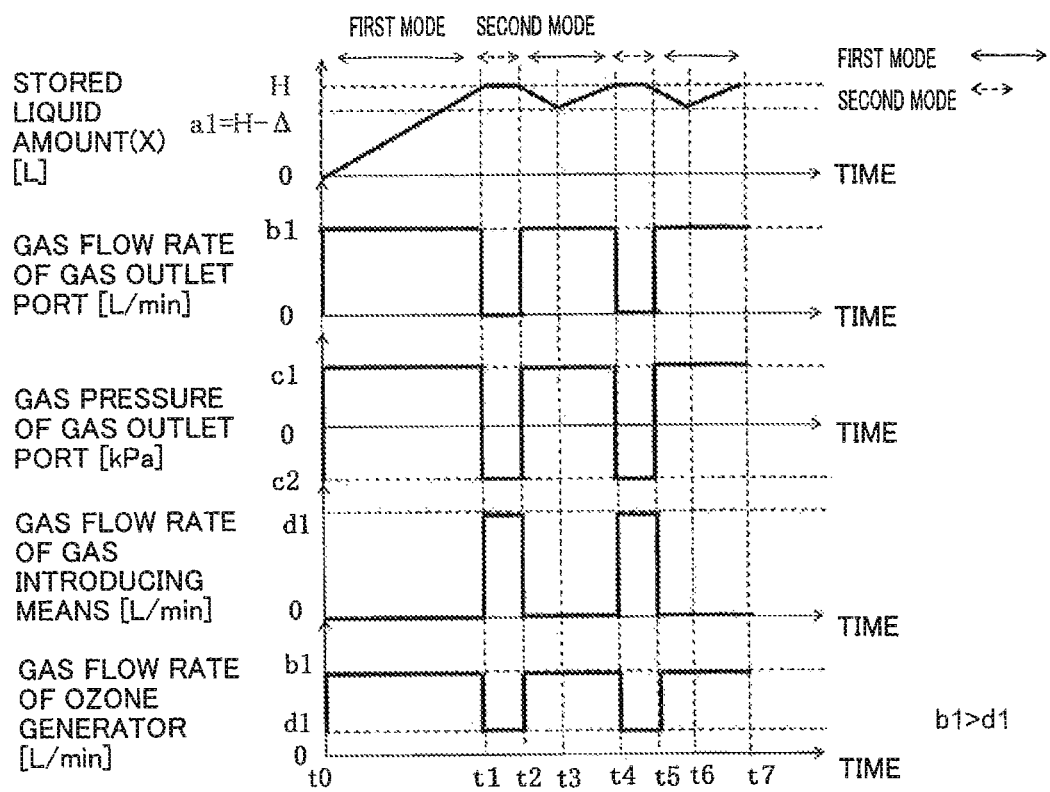
FIG. 11 is a diagram showing changes in a gas flow rate and gas pressure in each component of the ozone liquid generator according to one embodiment of the present invention.

FIG. 11 is a diagram schematically showing the experimental results of changes in pressure and flow rate in each component of the ozone liquid generator in accordance with the flowchart shown in FIG. 9 or 10. In this case, the stored liquid amount (X) in FIG. 11 indicates a stored liquid amount of the liquid stored in liquid storage tank 103. The gas flow rate and the gas pressure of the gas outlet port in FIG. 11 indicate the flow rate and pressure, respectively, of the gas flowing through gas outlet port 113. The gas flow rate of the gas introducing means in FIG. 11 indicates the flow rate of the gas flowing through gas introducing means 105. The gas flow rate of the ozone generator in FIG. 11 indicates the flow rate of the gas flowing through ozone generator 101. It is to be noted that opening and closing control means 104 is provided inside of liquid storage tank. 103, and gas outlet port 113 is provided outside of liquid storage tank 103 so as to be in communication therewith.

Furthermore, the experiments were performed using an ozone generator generating 100 mg/h of ozone, a venturi-type gas-liquid mixing portion 102a provided with a communication path having a diameter of φ 2.6 mm×a length of 5 mm, and a liquid storage tank capable of storing 500 cc of a liquid and having an inlet port of φ 9 mm, a gas outlet port of φ 1 mm and a liquid outlet port of φ9 mm. In this case, water was introduced into the gas-liquid mixer at a flow rate of 3.5 L/min and water pressure of 0.15 MPa for taking measurements. FIG. 11 shows approximate values such a H=400 cc, a1=390 cc, b1=2.8 L/min, c1=20 KPa, C2=3 KPa, and d1=1.5 L/min, which will be however schematically described for purposes of illustration.

Water is first introduced into gas-liquid mixing portion 102, and ozone generator 101 is turned ON to start generation of an ozone liquid, which corresponds to the state of t0 in FIG. 11 and S1 in the flowchart in FIG. 9 or 10. At this time, in the state where a value X of the stored liquid amount in liquid storage tank 103 is zero, water greater in amount than the liquid flowing out from liquid storage tank 103 is introduced into gas-liquid mixing portion 102.

When the operation is then started, since value X of the stored liquid amount in liquid storage tank 103 immediately after start of the operation is smaller than specific value H (X<H), ozone liquid generator 100 starts its operation in the first mode in which gas outlet port 113 is in an opened state while the gas introducing means is in a closed state. This corresponds to the state of t0 to t1 in FIGS. 11 and S3 in FIG. 9 or 10.

The water introduced through inlet port 108 of gas-liquid mixing portion 102 is introduced through pipe line b into liquid storage tank 103 and stored therein. Accordingly, a part of the air stored in liquid storage tank 103 is caused to flow out through liquid outlet port 112 of liquid storage tank 103 such that it is pushed out by the introduced water. Then, when the level of the water stored in liquid storage tank 103 becomes higher and exceeds the height at which liquid outlet port 112 of liquid storage tank 103 is located, liquid outlet port 112 is blocked by water.

At this time, the air within ozone liquid generator 100 is in a hermetically-sealed state in which the air is enclosed in the space of liquid storage tank 103, pipe line a and pipe line c. The hermetically-sealed state used herein means not a state where air is physically hermetically sealed, but a state where air is enclosed by a liquid.

The enclosed air is caused to flow by a liquid flow and introduced into ozone generator 101 through pipe line e, to generate ozone gas. Accordingly, the gas flow rate of gas outlet port 113 and the gas flow rate of ozone generator 101 each are b1 while the gas pressure of the gas outlet port is c1.

In addition, description has been made with reference to the configuration in which it takes an extremely short time period for the gas within liquid storage tank 103 to be in a hermetically-sealed state by blocking liquid outlet port 112 by the liquid after the start of generation by the ozone liquid generator. Accordingly, in the schematic diagram in FIG. 11, the gas flow rate and the gas pressure of the gas outlet port suddenly rise after start of generation by the ozone liquid generator.

The ozone gas introduced into ozone generator 101 is introduced from inlet port 109 of gas-liquid mixing portion 102 through pipe line a, and mixed with water introduced from the other inlet port 108, thereby generating an ozone liquid. The generated ozone liquid is caused to flow out through pipe line b to liquid storage tank 103, and separated into gas and a liquid.

Separation into gas and a liquid used herein means that an ozone liquid, which contains an ozone solution containing ozone gas dissolved in a liquid and an ozone bubble liquid containing ozone gas mixed as air bubbles in a liquid, is separated in liquid storage tank 103 into gas containing ozone gas, air and the like and a liquid containing an ozone solution.

Figure 12:
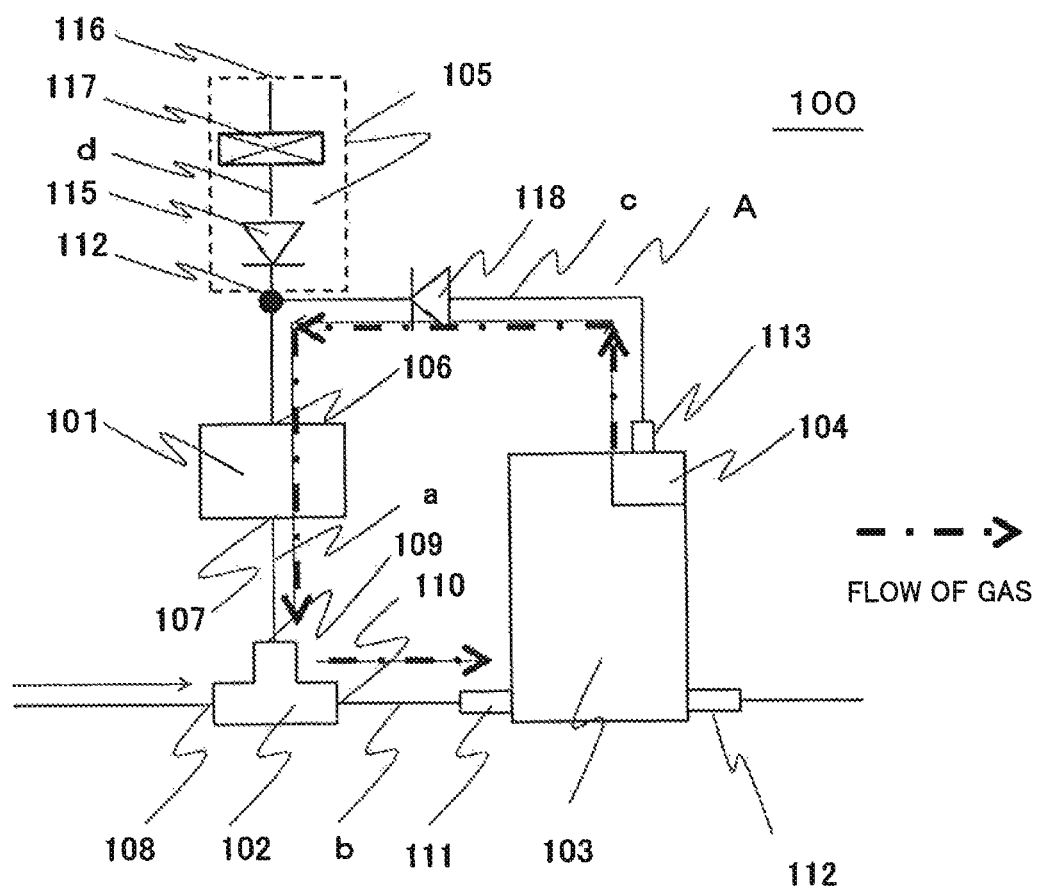
FIG. 12 is a schematic diagram showing the flow of gas at the time when the ozone liquid generator according to one embodiment of the present invention is in the first mode.

The separated gas containing ozone gas and air is to flow back to the space in which it is originally enclosed, and then circulate again. Accordingly, as in the schematic diagram showing the flow of the gas at the time when the ozone liquid generator in FIG. 12 is in the first mode, the gas within the ozone liquid generator is to circulate through liquid storage tank 103, pipe line c, ozone generator 101, pipe line a, gas-liquid mixing portion 102, pipe line b, liquid storage tank 103, pipe line c, ozone generator 101, and gas-liquid mixing portion 102 in this order. Consequently, since ozone generator 101 generates an ozone liquid based on the gas containing ozone gas that could not be completely dissolved in water and separated from the solution, it can generate an ozone liquid higher in concentration than that obtained in the configuration in which an ozone liquid is generated without circulating gas. In addition, the stored liquid amount in liquid storage tank 103 increases gradually with time.

Then, the operation is further continued, and the stored liquid amount in liquid storage tank 103 gradually increases. Then, when value X of the stored liquid amount becomes equal to or greater than specific value H, ozone liquid generator 100 is switched to the second mode in which gas outlet port 113 is in a closed state and gas introducing means 105 is in an opened state, thereby starting the operation. This corresponds to the state of t1 to t2 in FIGS. 11 and S4 in the flowchart in FIG. 9 or 10.

For example, when liquid storage tank. 103 is provided with, as opening and closing control means 104, control means capable of automatically opening and closing by itself such as a float valve illustrated in FIGS. 6 and 7 and self-weight opening and closing control means illustrated in FIG. 8, opening and closing control means 104 automatically comes into a closed state at t1 in FIG. 11.

Since opening and closing control means 104 is switched to a closed state when the operation is switched to the second mode, the flow of the gas flowing out through gas outlet port 113 of liquid storage tank 103 is stopped, and the gas pressure of gas outlet port 113 is decreased to c2, thereby creating a negative pressure. This is caused by the state where gas outlet port 113 is physically interrupted by opening and closing control means 104, which causes the gas at gas outlet port 113 pumped with the gas in liquid storage tank 103 in the positive pressure state to be suctioned by the suction force of gas-liquid mixing portion 102, thereby creating a negative pressure.

Figure 13:
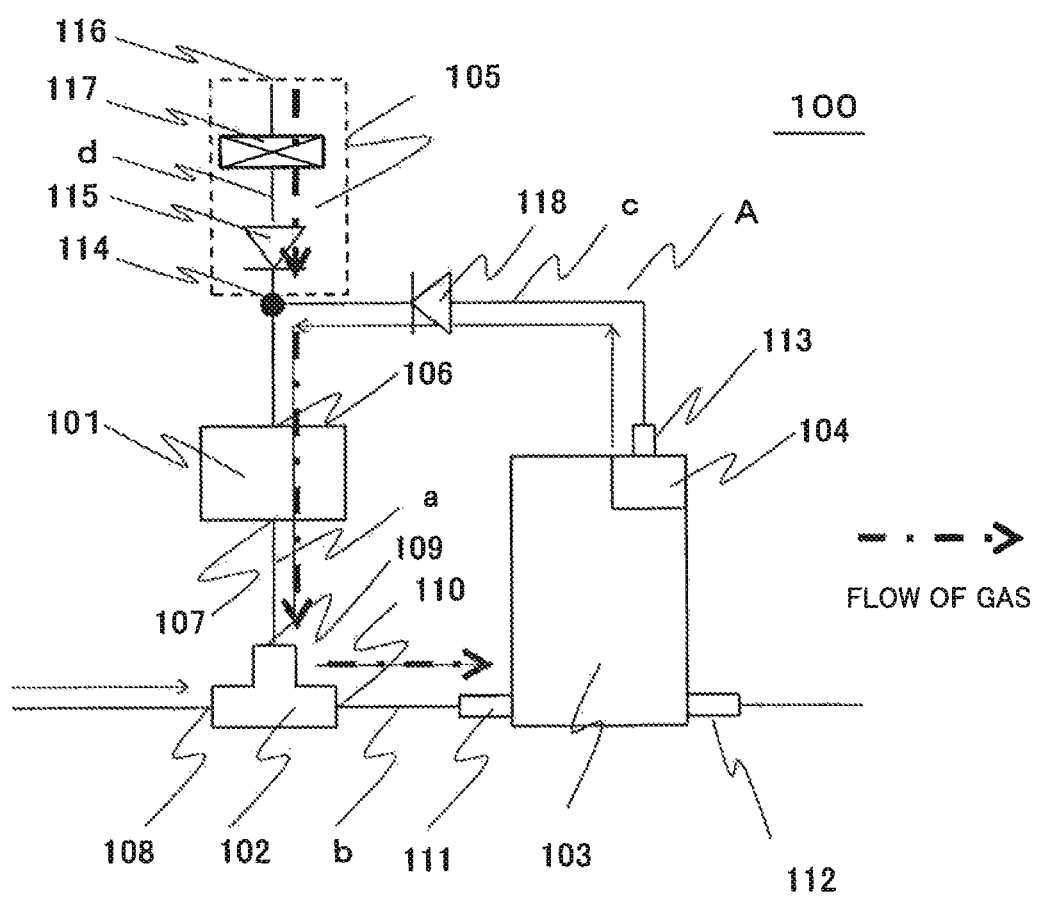
FIG. 13 is a schematic diagram showing the flow of gas at the time when the ozone liquid generator according to one embodiment of the present invention is in the second mode.

Furthermore, pipe line c in communication with gas outlet port 113 also becomes a negative pressure, so that air is suctioned from outside of the ozone liquid generator to inside thereof through gas introducing means 105 as shown in the schematic diagram in FIG. 13 in which the ozone liquid generator is in the second mode. The gas flow rate of gas introducing means 105 is d1 at this time.

In addition, gas introducing means 105 may be configured such that electronic opening and closing control is performed in cooperation with opening and closing control means 104, and thereby introducing gas. However, for example, by providing gas introducing means 105 having check valve 115 for stopping the flow of the gas from inside of the ozone liquid generator to outside thereof, it becomes possible to automatically suction gas from outside into pipe line a of a negative pressure. Accordingly, gas can be introduced in the low-cost and space-saving configuration without having to provide a solenoid valve, a control device and the like for electronic opening and closing control.

The suctioned air becomes ozone gas in ozone generator 101. Then, this ozone gas is mixed with water in gas-liquid mixing portion 102 to produce a gas-liquid mixture, which is then introduced into liquid storage tank 103. The gas-liquid mixture introduced into liquid storage tank 103 is again separated into gas such as ozone gas or air contained as air bubbles and a liquid, thereby increasing the volume of the air within liquid storage tank 103. Consequently, since the volume of the gas stored in liquid storage tank 103 increases and the volume of the liquid that can be stored in liquid storage tank 103 decreases, stored liquid amount X in liquid storage tank 103 decreases and becomes lower than specific value H, thereby switching the operation mode to the first mode again. This corresponds to the state of t2 to t4 in FIGS. 11 and 83 in the flowchart in FIG. 9 or 10. For example, when the opening and closing control means capable of automatically opening and closing by itself is provided as opening and closing control means 104 such as a float valve illustrated in FIGS. 6 and 7 and the self-weight opening and closing control means illustrated in FIG. 8, the stored liquid amount is less than stored liquid amount X at which the flow path can be blocked, and opening and closing control means 104 is automatically switched to an opened state.

Immediately after the operation mode is switched to the first mode, the air introduced from gas introducing means 105 during the time period of t1 to t2 is introduced into liquid storage tank 103 through the circulation path. Accordingly, the stored liquid amount in liquid storage tank 103 decreases, which is eventually stabilized. Stored liquid amount X in liquid storage tank 103 at this time is a1 in FIG. 11, which corresponds to t3 in FIG. 11. Although schematically shown in FIG. 11 for the purposes of illustration, the difference between the values of H and a1 is very small. Therefore, it is possible to implement a configuration such that H and a1 have an almost equal value.

Then, the ozone liquid generator operates in the same manner as in the above-mentioned first mode, and stored liquid amount X in liquid storage tank 103 starts to rise again. Then, when stored liquid amount X is equal to or greater than specific value H, the operation mode is switched to the second mode to start the operation. This corresponds to the state of t4 to t5 in FIGS. 11 and S4 in the flowchart in FIG. 9 or 10.

Subsequently, as in t4 to t7 in FIG. 11, the operation mode is alternately switched between the first mode and the second mode mentioned above in accordance with the stored liquid amount in the liquid storage tank, so that stored liquid amount X in liquid storage tank 103 can be adjusted at a specific stored liquid amount.

Although schematically shown in FIG. 11 for the purposes of illustration, during the time period of the operation in the second mode, adjustment can be made as appropriate depending on the design of the embodiment configuration. Thus, the operation may be set to be performed in an extremely short time period.

In addition, the mode switching described above is set to be automatically accomplished by opening and closing control means 104 depending on stored liquid amount X of the liquid stored in liquid storage tank 103. For automatic switching by opening and closing control means 104, opening and closing control may be done by a mechanical apparatus like the opening and closing control means in FIGS. 6 to 8, or done by electronic control.

The present invention is not limited to each embodiment described above, but can be variously modified within the scope defined by the claims. Any embodiment obtained by appropriately combining technical means disclosed in different embodiments also falls within the technical scope of the present invention,

INDUSTRIAL APPLICABILITY

The present invention can be applied to an ozone liquid generator and a method of generating an ozone liquid.

REFERENCE SIGNS LIST 100 ozone liquid generator, 101 ozone generator, 102 gas-liquid mixing portion, 103 liquid storage tank, 104 opening and closing control means, 105 gas introducing means, 106 inlet port, 107 outlet port, 108 inlet port, 109 inlet port, 110 outlet port, 111 inlet port, 112 liquid outlet port, 113 gas outlet port, 114 opening, 115 first check valve, 116 external port, 117 ozone filter, 118 second check valve, 104a, 104b float valve, 104c self-weight opening and closing control means, 119 pumping portion, 120 container portion, 121a, 121b float, 122a, 122b float guide, 123a, 123b float plug, 124 self-weight plug, 125 blocking portion, 126 partition plate, 127 elastic means, 128 support portion, 129 vent, 130 first storage chamber, 131 second storage chamber, 21 inlet path, 22 communication path, 23 outlet path, 41 outer wall, 42 flow suppression plate, 51 outer wall, 52 inner wall, 53 inner cylinder, 54 outer cylinder, A circulation path.

The invention claimed is:
1. An ozone liquid generator comprising:
an ozone generator generating ozone gas;
a gas-liquid mixer mixing said ozone gas and a liquid;
a liquid storage tank separating an introduced gas-liquid mixture into gas and a liquid;
a circulation path through which gas circulates among the ozone generator, the gas-liquid mixer and the liquid storage tank; and
a float valve that controls a flow of gas flowing out through a gas outlet port of said liquid storage tank in accordance with a stored liquid amount in said liquid storage tank; wherein
the float valve blocks a flow path of the gas outlet port of the liquid storage tank when a liquid level of the liquid stored in the liquid storage tank is equal to or higher than a specific height;
the circulation path includes a check valve that introduces gas from outside when the float valve blocks the flow path of the gas outlet port of the liquid storage tank; and
the check valve stops the flow of gas from inside of the circulation path to outside of the check valve.

2. ozone liquid generator according to claim 1, wherein said float valve is formed of
   a float floating in a liquid in said liquid storage tank,
   a float plug blocking said gas outlet port of said liquid storage tank, and
   a float guide urging said float plug to move toward said gas outlet port of said liquid storage tank.

3. The ozone liquid generator according to claim 2, wherein said float guide is formed in a line shape or a plate shape, and connected to said liquid storage tank and said float, and said float plug is provided in a connection between said liquid storage tank and said float.

4. The ozone liquid generator according to claim 1, wherein an additional check valve that stops the flow of gas from said ozone generator to said liquid storage tank is provided in said circulation path between said gas outlet port of said liquid storage tank and the check valve.

5. A method of generating an ozone liquid by an ozone liquid generator separating an ozone liquid generated from ozone gas and a liquid into gas and a liquid by a liquid storage tank and causing the separated gas to flow through an ozone gas generator, said method further comprising the steps of:
   when a stored liquid amount of the liquid in said liquid storage tank is less than a specific amount, causing gas to flow out from said liquid storage tank and circulating the gas by utilizing liquid buoyancy; and
   when the stored liquid amount of the liquid in said liquid storage tank is equal to or greater than the specific amount, stopping a flow of the gas flowing out from said liquid storage tank by utilizing liquid buoyancy; and
   introducing gas from outside of the ozone liquid generator in cooperation with the step of stopping the flow of the gas.

6. A method of storing a liquid for an ozone liquid generator separating an ozone liquid generated from ozone gas and a liquid into gas and a liquid by a liquid storage tank, and causing the separated gas to flow through an ozone gas generator, said method further comprising the steps of:
   when a stored liquid amount in said liquid storage tank is equal to or greater than a specific amount, stopping a flow of gas flowing out from said liquid storage tank by utilizing liquid buoyancy, and
   introducing gas from outside of the ozone liquid generator, and adjusting the stored liquid amount in said liquid storage tank in cooperation with the step of stopping the flow of the gas.

\* \* \* \* \*